United States Patent Office 3,300,433
Patented Jan. 24, 1967

3,300,433
XANTHOGEN DISULFIDE AND AMINE PREPARATION OF POLYCHLOROPRENE
David Apotheker, Wilmington, Del., assignor to E. I. du Pont de Nemours and Company, Wilmington, Del., a corporation of Delaware
No Drawing. Filed Feb. 20, 1964, Ser. No. 346,122
5 Claims. (Cl. 260—29.7)

This application is a continuation-in-part of my application-in-part Serial No. 130,769, filed August 11, 1961, now abandoned.

This invention relates to prevulcanized chloroprene polymer latices and their preparation. In addition, the latices obtained by the present novel process may be used in the preparation of high-strength dipped films which cure faster and at lower temperatures than dipped films prepared from conventional chloroprene polymer latices.

In the preparation of dipped films from chloroprene polymer latices, it is usually necessary, to obtain optimum tensile properties, to subject the dried film to a temperature of about 140° C. for at least one hour. While for many applications it may be satisfactory to use a lower temperature for a longer time, the state of cure obtained in this way does not equal that obtained at the higher temperature.

It is, therefore, an object of this invention to provide a chloroprene polymer latex which will yield dipped films having excellent properties when cured at lower temperatures and for shorter times than are feasible when conventional chloroprene polymer latices are used.

These and other objects will become apparent in the following description and claims.

More specifically, the present invention is directed to the preparation of a prevulcanized chloroprene polymer latex by (1) polymerizing chloroprene in aqueous emulsion in the presence of about 0.05 to 2 parts, by weight, per 100 parts of monomer, of a dialkyl xanthogen disulfide in which disulfide the alkyl group contains 1 to 8 carbon atoms, the polymerization being carried out to the maximum monomer conversion at which only sol polymer is obtained, (2) adding to the latex at least 0.005 mole, per 100 parts of polymer, of hydrazine or a primary aliphatic monoamine or polyamine and subjecting the latex to a temperature of about 10° C. to 100° C. for a sufficient length of time to convert the sol polymer contained in the emulsion to gel polymer, the treatment with said amine being carried out at a pH greater than 10 and in the absence of atmospheric oxygen.

By "sol polymer" is meant polymer which is soluble in benzene. By "gel polymer" is meant polymer which is insoluble in benzene. Benzene solubility is determined by conventional methods, as for example, by isolating a sample of the polymer and adding the dried sample to a quantity of benzene. A 2- to 3-gram sample of "sol" polymer will dissolve in 250 milliliters of benzene at room temperature in 5 to 10 hours with mild agitation. In carrying out the processs of this invention, one may polymerize chloroprene alone or one may copolymerize chloroprene with another copolymerizable monomer containing olefinic unsaturation to obtain a copolymer containing at least 40 percent by weight of chloroprene. Satisfactory monomers copolymerizable with chloroprene include those compounds containing the group $CH_2=C<$ of the following representative types: vinyl-substituted aromatic compounds, such as styrene, vinyltoluenes, and vinylnaphthalenes; acrylic and methacrylic acids and derivatives thereof, such as esters and nitriles, e.g., methyl methacrylate and acrylonitrile; and conjugated diolefinic compounds, such as 1,3-butadiene, isoprene and 2,3-dichloro-1,3-butadiene.

The polymerization is carried out in an aqueous emulsion using any of the conventional emulsifying agents suitable for chloroprene polymerizations. These include water-soluble salts of compounds of the following types: long-chain fatty acids; rosins and modified rosins, or partially polymerized rosins; fatty alcohol sulfates, arylsulfonic acids, such as nonylbenzenesulfonic acid or the formaldehyde condensation product of naphthalenesulfonic acid.

Any of the conventional free-radical polymerization catalysts may be used. These include alkali metal or ammonium ferricyanides, alkali metal or ammonium persulfates, and inorganic or organic peroxides such as hydrogen peroxide, cumene hydroperoxide, and dibenzoyl peroxide.

The polymerization may be carried out between 0° C. and 80° C., preferably between 40° and 50° C. Below 0° C. the polymerization is inconveniently slow and above 80° C. the reaction is hard to control.

The concentration of monomeric material present in the aqueous emulsion is not critical. In general, 30 to 60 percent, by weight, based on the total weight of the emulsion, is the range of concentrations of monomer used in the preparation of the latex.

It is preferred to carry out the polymerization in an alkaline system having a pH greater than 10. If the pH is lower than this, it is necessary to adjust the pH of the emulsion to higher than 10 before treatment with the amine in order to avoid coagulation of the latex during the amine treatment.

The dialkyl xanthogen disulfides which may be used in the practice of the present invention have the formula

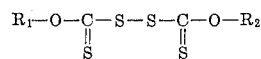

in which $R_1$ and $R_2$ are alkyl groups containing one to eight carbon atoms. Examples of suitable compounds are dimethyl xanthogen disulfide, diethyl xanthogen disulfide, dipropyl xanthogen disulfide, diisopropyl xanthogen disulfide, the dibutyl xanthogen disulfides, and bis (2-ethylhexyl) xanthogen disulfide. The preferred compounds are those in which the alkyl groups have 1–4 carbon atoms.

The amount of dialkyl xanthogen disulfide to be used in accordance with this invention varies from about 0.05 part to about 2 parts, by weight, per hundred parts of monomer. If more than about 2 parts of the dialkyl xanthogen disulfide is used, the final latex does not yield a curable film when treated with the amine. When less than 0.05 part is used, there is not a sufficient amount of xanthogen compound present in the system to prevent formation of gel polymer. The preferred amount is the amount of dialkyl xanthogen disulfide just sufficient to allow polymerization to proceed to 100% monomer conversion without the formation of gel polymer. The amount of each dialkyl xanthogen disulfide required will depend on the molecular weight of the disulfide. Also, for an unknown reason, there are small differences in effectiveness among molecularly equivalent amounts of the various dialkyl xanthogen disulfides. In the case of diethyl xanthogen disulfide, about 0.5 to 0.6 part by weight is required. In the case of diisopropyl xanthogen disulfide about 0.7 part is required; 0.7 to 1 part is particularly preferred. In general the preferred amount of dialkyl xanthogen disulfide ranges from about 0.5 part to about 1.5 parts.

The amount of each dialkyl xanthogen disulfide required to prevent formation of gel polymer when polymerization is carried to 100 percent monomer conversion can be determined by known techniques and is within the scope of one skilled in the art. In the case of diisopropyl xanthogen disulfide, a minimum of about 0.7 part is required to ensure that the polymer will be in sol form when the polymerization is carried to 100 percent monomer conversion. When less than this amount is used, the polymerization should be stopped before it has proceeded to 100 percent conversion, but it is critical that polymerization be allowed to proceed to the highest possible conversion at which only sol polymer is obtained. The determination of the percent of monomer conversion permissible in a polymerization may be made by known methods. One representative method is the taking of samples of latex during the course of a polymerization, isolating polymer from latex, and examining the polymer for a benzene-insoluble component. Polymerization in subsequent runs is then stopped at the conversion just prior to the formation of benzene-insoluble polymer. A more convenient way is to determine intrinsic viscosity of successive samples of latex during a polymerization using the Vistex method described in "Indudstrial and Engineering Chemistry," 49, 1709–10 (1957). Formation of microgel is indicated by a decrease in intrinsic viscosity of the latex. Polymerization in subsequent runs is then stopped at the conversion just prior to microgel formation. Optionally, polymerization may be stopped just after the peak in intrinsic viscosity has been reached. A convenient short method is to dissolve 2 milliliters of the latex in 100 milliliters of tetrahydrofuran, shake it thoroughly, and observe the turbidity of the resulting solution. The first point at which slight turbidity is observed is the point at which polymerization should be stopped.

Polymerization may be stopped by the addition of "short-stopping" agents, such as phenothiazine and 4-tert-butyl-catechol, as described in U.S. Patent 2,576,009. Unreacted monomer may be removed by known methods, such as by steam stripping as disclosed in U.S. Patent 2,467,769.

The treating agent which is used to prevulcanize the chloroprene polymer latex is hydrazine or an aliphatic primary amine, which amine may be a monoamine or a polyamine. By the term "aliphatic" is meant that the amine it attached to an aliphatic carbon atom. Aromatic rings may be present in the molecule with the proviso that the amino group is not directly attached to the aromatic nucleus. Suitable amines include both cyclic and acyclic alkylamines, acyclic alkylenediamines, cycloalkylenediamines, and polyalkylenepolyamines. It is to be understood that these aliphatic radicals may be substituted with phenyl radicals. Also the aliphatic chains may be interrupted by or fused with arylene radicals, provided that the amino group is attached to an aliphatic carbon atom. Thus among suitable treating agents are included such amines as aralkylamines, poly(aminoalkyl)-substituted aromatic rings and benzo-substituted cycloaliphatic amines. The radicals to which the amino group or groups are attached preferably are those containing no more than 16 carbon atoms since there is no advantage to be gained in using amines of higher molecular weight.

Representative examples of suitable monoamines are methylamine, ethylamine, n-propylamine, isopropylamine, n-butylamine, sec-butylamine, hexylamine, decylamine, 2-ethylhexylamine, cyclohexylamine, benzylamine, and phenethylamine. Representative examples of polyamines include ethylenediamine, 1,2-propanediamine, 1,4-butanediamine, 1,6-hexanediamine, 1,4-cyclohexanediamine, 1,10-decanediamine, 2-phenyl-1,3-propanediamine, $\alpha,\alpha'$-xylenediamine, 2,4-diphenyl-1,3-butanediamine, diethylene triamine, and tetraethylenepentamine.

The preferred amines are those containing 2 to 8 carbon atoms, particularly alkylamines or alkylenediamines. The most preferred amines are ethylenediamine, 1,6-hexanediamine, and butylamine.

At least 0.005 mole of hydrazine or amine, per 100 parts of polymer, is required in order to obtain films having satisfactory tensile properties. The preferred amounts range from 0.008 to 0.2 mole. More than this amount may be used but there is no advantage to be gained from using these larger amounts. This range of 0.005 mole to 0.2 mole corresponds, for example, to 0.58 to 23.2 parts of 1,6-hexanediamine and to 0.25 to 10 parts of hydrazine hydrate per 100 parts of polymer.

It is preferred to add the hydrazine or amine to the latex in a dilute form in order to avoid coagulation of the latex. Hydrazine may be conveniently added as an aqueous solution of hydrazine hydrate. Water-soluble amines may also be added as aqueous solutions. If the amine is not watersoluble, it may be emulsified with water, using an emulsifying agent such as sodium oleate or the sodium salt of a fatty alcohol sulfate.

The latex may be agitated during the addition of the amine. This, however, is not essential.

It is essential in practicing the present invention to carry out the amine treatment in an inert atmosphere, i.e., in an atmosphere free of atmospheric oxygen. This is conveniently done by flushing the reaction vessel free of oxygen with an inert gas such as nitrogen and maintaining an atmosphere of the gas in the vessel during the treatment.

The reaction is carried out at any temperature from 10° C. to 100° C. The time required for the conversion of the sol polymer to gel polymer depends upon the temperature. Below 10° C. the reaction proceeds too slowly to be practical. Temperatures above 100° C. are not attainable in the aqueous latex at ordinary pressures. The time required will also vary somewhat with the effectiveness and amount of the particular treating agent being used. The preferred temperature range is from 60 to 100° C. At 60° C., twelve hours is usually sufficient to gel the polymer, and at 100° C., gel formation should be complete within one-half-hour.

The latex prepared in accordance with this invention is particularly suitable for the preparation of dipped films which cure rapidly and have excellent tensile properties. The dipped films may be prepared by conventional methods, as, for example, as described in Cook and Fitch, "Neoprene Dipped Goods," Rubber Chemicals Division (now Elastomer Chemicals Department), E. I. du Pont de Nemours and Co., Report No. 52–3, December 1952. The films produced from the latex prepared in accordance with this invention require shorter times and lower temperatures to develop optimum tensile properties than do films prepared from conventional neoprene latices.

The treated latex prepared in accordance with this invention may also be used for the preparation of foam and for other applications in which a prevulcanized latex is desired.

Representative examples illustrating the present invention follow.

In the examples, the tensile properties of the films are measured by ASTM Method D–412–51–T except that the films are about 1/32 to 1/64 inch in thickness.

*Example 1*

A. A latex is prepared by polymerizing chloroprene in an aqueous emulsion using the following recipe:

| | Parts by weight |
|---|---|
| Chloroprene | 100 |
| Disproportionated rosin | 4 |
| Sodium hydroxide | 0.85 |
| Diisopropyl xanthogen disulfide | 0.7 |
| Water | 100 |
| Sodium sulfite | 0.3 |

An atmosphere of nitrogen is maintained in the reaction vessel. The catalyst used is a one percent solution of potassium persulfate which is added to the polymerization system at a rate sufficient to maintain the desired rate of polymerization. The temperature of polymerization is 40° C., and polymerization is carried out to a 100 percent monomer conversion. The polymer content of the latex is about 50 percent.

A 2-gram sample of polymer is completely soluble in 250 milliliters of benzene at room temperature with mild agitation. The sample is obtained in the following manner:

A sample of latex is removed from the system and the polymer is precipitated with acetone. The wet coagulum is dissolved in benzene and reprecipitated with acetone. The coagulum is separated from the benzene and dried first in air and then under vacuum at 25–30° C.

B. Five part (0.043 mole) of 1,6-hexanediamine, by weight, per 100 parts of polymer is added to the latex while maintaining the latex under an atmosphere of nitrogen. The amine is added as a 30 percent aqueous solution. The pH of the latex is 12.9. The latex is heated to 80° C. and maintained at this temperature for one hour.

To show that the polymer present in the latex has been converted to gel form, a sample is isolated and tested for solubility in benzene as described in paragraph A above. It is found to be insoluble in benzene. This shows that the polymer has been cross-linked to gel form.

C. Essentially the same results are obtained when instead of diisopropyl xanthogen disulfide, one of the following is used in the preparation of the polymer.

|  | Parts by weight |
|---|---|
| Polychloroprene (dry basis) | 100 |
| Zinc oxide | 5 |
| Clay | 10 |
| N-phenyl-2-naphthylamine | 2 |
| Sodium salt of sulfated methyl oleate | 1 |

Dipped films are prepared from the compounded latices by the following method: A form is immersed in a coagulant consisting of an acetone-methanol solution of calcium chloride and calcium nitrate. The form is withdrawn from the coagulant and immersed in the compounded latex for 5 minutes. The form containing the coagulated latex is withdrawn from the latex and again immersed in the coagulant for a period of 10 seconds. The coagulated film is leached in water for 4 hours and dried in a hot air oven for 2 hours at 70° C. and then for an additional 15 minutes at 100° C. The tensile properties of the films are measured both before and after curing at 100° C. for 15 minutes.

The following table shows the tensile properties of both films before and after curing for 15 minutes at 100° C.

|  | Films from Latex A | | Films from Latex B | |
|---|---|---|---|---|
|  | (1) | (2) | (3) | (4) |
|  | Before curing at 100° C. | After curing at 100° C. | Before curing at 100° C. | After curing at 100° C. |
| Modulus at 600% elongation, p.s.i. | 750 | 800 | 575 | 675 |
| Tensile strength at the break, p.s.i. | 3,150 | 3,325 | 2,175 | 2,350 |
| Elongation, percent | 970 | 950 | 1,000 | 980 |

|  | Parts by weight |
|---|---|
| Dimethyl xanthogen disulfide | 0.5 |
| Diisoamyl xanthogen disulfide | 1.0 |
| Bis(2-ethylhexyl)xanthogen disulfide | 1.2 |

D. Essentially the same results are obtained when, instead of 1,6-hexanediamine, tetraethylenepentamine is added to the latex.

*Example 2*

A. A latex is prepared as described in Example 1, paragraph A. Three parts (0.06 mole) of hydrazine hydrate by weight per 100 parts of polymer is added to the latex while maintaining the latex in an atmosphere of nitrogen. The hydrazine hydrate is added as a 30 percent aqueous solution. The latex is heated to 90° C. and is maintained at that temperature for one-half hour.

B. For comparison, a conventional polychloroprene latex is prepared by polymerizing chloroprene using the following recipe:

|  | Parts by weight |
|---|---|
| Chloroprene | 100 |
| Water | 100 |
| Nancy wood rosin | 4 |
| Sulfur | 0.01 |
| Iodoform | 0.10 |
| Sodium hydroxide | 1.10 |
| Copper ion | 0.00003 |
| Potassium persulfate | 0.40 |
| Sodium 2-anthraquinone-sulfonate | 0.02 |

The polymerization is carried out at 40° C. by adding an aqueous solution of the potassium persulfate and sodium 2-anthraquinone-sulfonate to an emulsion containing the other ingredients. An atmosphere of nitrogen is maintained over the reaction vessel. Polymerization is carried to 95–100 percent conversion. The latex is stabilized by the addition of an aqueous solution of diethanolamine. The polymer content of the latex is approximately 50 percent.

C. The latices of both paragraph A and paragraph B above are compounded using the following recipe:

*Example 3*

The procedure of Example 1, paragraphs A and B, is followed except that after the addition of the amine the latex is allowed to stand at room temperature (20–25° C.). At varying intervals films are prepared from the latex as described in Example 2, paragraph C, and are cured at 100° C. for 15 minutes. After 128 hours the films obtained have developed their optimum tensile properties. These are:

| | |
|---|---|
| Modulus at 600% elongation, p.s.i. | 720 |
| Tensile strength at the break, p.s.i. | 3280 |
| Elongation, percent | 970 |

*Example 4*

To show the effect of using different amounts of diisopropyl xanthogen disulfide, three different latices are prepared using the procedure described in Example 1, paragraph A, but using different proportions of diisopropyl xanthogen disulfide as shown below:

|  | Parts of diisopropyl xanthogen disulfide | Monomer Conversion |
|---|---|---|
| A | 0.1 | 25 |
| B | 0.75 | 100 |
| C | 2.0 | 100 |

In preparing latex A the point at which polymerization should be stopped is determined by removing samples of the latex during the polymerization, dissolving 2 milliliters in 100 milliliters of tetrahydrofuran, shaking thoroughly, and observing the solution for turbidity. Polymerization is stopped when the first occurrence of turbidity indicates the presence of microgel. Polymerization is stopped by adding an emulsion containing 0.01 part of phenothiazine and 0.01 part of p-tert-butyl catechol as described in U.S. 2,576,009. Unreacted monomer is removed by steam stripping as described in U.S. 2,467,-769. The resulting latex has a polymer content of 12.5 percent. The latices each have a pH of about 12.8. To each latex is added 2.5 parts of 1,6-hexanediamine as a 30 percent aqueous solution per 100 parts of latex. In latex A this corresponds to 20 parts (0.172 mole) of amine per 100 parts of polymer since the polymer content of this latex is about 12.5 percent. In latex B and latex C this corresponds to 5 parts (0.043 mole) of 1,6-hexanediamine since the polymer content of these latices is about 50 percent. Each latex is heated to 90° C. and kept at this temperature for 30 minutes while maintaining an atmosphere of nitrogen over the latex. The latices are compounded and dipped films are prepared from them, as described in Example 2, paragraph C. The films are cured for 15 minutes at 100° C. and the tensile properties are measured. The results are shown below:

|  | A | B | C |
| --- | --- | --- | --- |
| Modulus at 600% elongation, p.s.i. | 850 | 925 | 825 |
| Tensile strength at the break, p.s.i. | 2,750 | 3,500 | 2,620 |
| Elongation, percent | 880 | 940 | 870 |

*Example 5*

A latex having a pH of about 12.8 is prepared as described in Example 1, paragraph A, except that 1 part of dibutyl xanthogen disulfide is used instead of 0.7 part of diisopropyl xanthogen disulfide. The latex is maintained in an atmosphere of nitrogen. Five parts (0.043 mole) of 1,6-hexanediamine, per 100 parts of polymer are added to the latex as a 30 percent aqueous solution, and the latex is heated to 90° C. and maintained at this temperature for 30 minutes. The latex is compounded and used for the preparation of dipped films as described in Example 2, paragraph C. The films are cured for 15 minutes at 100° C. and their tensile properties are measured. The results are shown below:

Modulus at 600% elongation, p.s.i. _____ 885
Tensile strength at the break, p.s.i. _____ 2960
Elongation, percent _____ 925

*Example 6*

A latex is prepared as described in Example 1, paragraph A, except that 0.75 part of diisopropyl xanthogen disulfide is used instead of 0.7 part. The pH of the latex is about 12.8. To one sample of the latex is added 5 parts (0.068 mole) per 100 parts of polymer, of butylamine. To another portion of the latex is added 5 parts of ethylenediamine (0.078 mole) per 100 parts of polymer. Both amines are added in the form of a 30 percent aqueous solution. Both samples of latex are maintained under a blanket of nitrogen. The sample to which the butylamine has been added is heated to 90° C. and kept at this temperature for 30 minutes. The sample to which the ethylamine has been added is heated to 100° C. and kept at this temperature for 30 minutes. Each of the latices is compounded and used in the preparation of dipped films as described in Example 2, paragraph C. The films are cured at 100° C. for 15 minutes. The tensile properties of these films are measured. The data are as follows:

|  | Butylamine | Ethylenediamine |
| --- | --- | --- |
| Modulus at 600% elongation, p.s.i. | 800 | 700 |
| Tensile strength at the break, p.s.i. | 3,275 | 3,000 |
| Elongation, percent | 910 | 935 |

*Example 7*

A latex is prepared as described in Example 1, paragraph A, except that 0.75 part of diisopropyl xanthogen disulfide is used instead of 0.7 part. The pH of the latex is about 12.8. To the latex is added 7.5 parts (0.065 mole) per 100 parts of polymer of 1,6-hexanediamine, added as a 30 percent aqueous solution, while maintaining the latex under an atmosphere of nitrogen. The latex is heated to 90° C. and maintained at this temperature for 30 minutes.

Dipped films are prepared from this latex as described in Example 2, paragraph C. The films after curing for 15 minutes at 100° C. have the following tensile properties:

Modulus at 600% elongation, p.s.i. _____ 800
Tensile strength at the break, p.s.i. _____ 2920
Elongation, percent _____ 850

*Example 8*

A latex is prepared as described in Example 1, paragraph A, except that 0.85 part of diisopropyl xanthogen disulfide is used instead of 0.7 part. The pH of the latex is about 12.8. To the latex is added 2.5 parts (0.022 mole) per 100 parts of polymer, of 1,6-hexanediamine, added as 30 percent aqueous solution, while maintaining the latex under an atmosphere of nitrogen. The latex is heated to 90° C. and maintained at this temperature for 30 minutes.

Dipper films are prepared from this latex as described in Example 2, paragraph C. The films after curing for 15 minutes at 100° C. have the following tensile properties:

Modulus at 600% elongation, p.s.i. _____ 425
Tensile strength at the break, p.s.i. _____ 2550
Elongation, percent _____ 1100

*Example 9*

Ten grams of hexylamine are emulsified in 15 milliliters of water using the sodium salt of technical lauryl sulfate as the emulsifying agent (5 grams of a 33 percent solution of the alcohol sulfate is used). The emulsion is added to 400 grams of latex B of Example 4. The resulting material is heated at 90° C. for 0.5 hour under nitrogen with stirring. Dipped films are prepared as described in Example 2, paragraph C. The tensile properties of the films are shown below after curing for 15 minutes and for 30 minutes at 100° C.

|  | 15'/100° C. | 30'/100° C. |
| --- | --- | --- |
| Modulus at 600% elongation, p.s.i. | 625 | 800 |
| Tensile strength at the break, p.s.i. | 2,925 | 3,150 |
| Elongation, percent | 950 | 930 |

*Example 10*

A latex is prepared using the following recipe:

| | Parts by weight |
| --- | --- |
| Chloroprene | 100 |
| Disproportionated rosin | 4 |
| Water | 91.6 |
| Sodium hydroxide | 1.1 |
| Diethyl xanthogen disulfide | 0.566 |
| Sodium formaldehyde sulfoxylate | 0.2 |

A nitrogen atmosphere is maintained in the polymerization vessel. Polymerization is effected at 30° C. by the addition of a 1% solution of potassium persulfate. Monomer conversion is 100%.

The polymer content of the latex is 50% and the pH is 12–13. A sample of polymer isolated from the latex as described in Example 1 is soluble in benzene.

To the latex is added one part by weight of 1,6-hexanediamine (0.0086 mole) per 100 parts of polymer, and the latex is maintained at 50° C. for 48 hours in a nitrogen atmosphere. Dipped films prepared from the latex have properties similar to those prepared from latex A in Example 2.

Similar results are obtained if, after the 1,6-hexanediamine is added, the latex is maintained at 60° C. for 16 hours instead of at 50° C. for 48 hours.

Similar results are obtained when this example is repeated except that the chloroprene monomer is replaced by one of the following mixtures of monomers (all parts are by weight):

(a) A mixture of 93 parts of chloroprene and 7 parts of 2,3-dichloro-1,3-butadiene.
(b) A mixture of 97.5 parts of chloroprene and 2.5 parts of methacrylic acid.
(c) A mixture of 44 parts of chloroprene and 56 parts of 2,3-dichloro-1,3-butadiene.

The preceding representative examples may be varied within the scope of the total specification disclosure, as utilized by one skilled in the art, to achieve essentially the same results. For example, if the colloidal stability of the latex is to be improved against coagulation during storage, I have found that from 3 to 5 parts by weight, per 100 parts of monomer, of a mixed emulsifying agent should be used during the polymerization; this agent comprises from 15 to 50 percent of a fatty acid soap and from 50 to 85 percent of a rosin acid soap. I have also found that the latices of my invention can be treated so as to produce strong films even after prolonged storage. One treatment involves the addition of 0.1 to 1 part of formaldehyde to 100 parts of the polymer. Another involves the use of certain secondary monoamines, e.g., piperidine or morpholine, in conjunction with the hydrazine or primary amine in the process described above in amounts of from 0.5 to 5 parts of the latter to 1 part of the former.

As many apparently widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for preparing a prevulcanized chloroprene polymer latex from which films of high tensile strength may be produced, said process being carried out by (1) polymerizing chloroprene in aqueous emulsion in the presence of about 0.05 to 2 parts, by weight, per 100 parts of monomer, of a dialkyl xanthogen disulfide, the alkyl group of said disulfide containing 1 to 8 carbon atoms, said polymerization being carried out to the maximum monomer conversion at which only sol polymer is obtained, followed by (2) adding to the resulting latex at least 0.005 mole, per 100 parts of said polymer, of a member selected from the group consisting of hydrazine, an aliphatic primary monoamine and an aliphatic primary polyamine, and then (3) subjecting the latex to a temperature within the range of about 10° C. to 100° C. until the sol polymer contained in the emulsion is converted to gel polymer, the treatment with said amine being carried out at a pH greater than 10 and in an inert atmosphere.

2. A process for preparing a prevulcanized chloroprene polymer latex from which films of high tensile strength may be produced, which process comprises (1) polymerizing chloroprene in aqueous emulsion in the presence of about 0.5 to 1.5 parts, by weight, per 100 parts of monomer, of a dialkyl xanthogen disulfide, the alkyl group of said disulfide containing from 1 to 4 carbon atoms, said polymerization being carried out at a temperature of from about 0° to 80° C. to the maximum monomer conversion at which only sol polymer is obtained, followed by (2) adding to the resulting latex from about 0.008 to 0.2 mole, per 100 parts of said polymer, of a member selected from the group consisting of hydrazine, an aliphatic primary monoamine and an aliphatic primary polyamine, and then (3) subjecting the latex to a temperature within the range of about 60° to 100° C. until the sol polymer contained in the emulsion is converted to gel polymer, the treatment with said amine being carried out at a pH greater than 10 and in an inert atmosphere.

3. A process according to claim 2 wherein the disulfide is diisopropyl xanthogen disulfide and the amine is 1,6-hexanediamine.

4. A prevulcanized chloroprene polymer latex prepared by the process of claim 1.

5. A prevulcanized chloroprene polymer latex prepared by the process of claim 2.

References Cited by the Examiner
UNITED STATES PATENTS

| | | | |
|---|---|---|---|
| 2,321,693 | 6/1943 | Meisenburg et al. | 260—92.3 |
| 2,359,698 | 10/1944 | Uhlig | 260—92.3 |
| 2,395,493 | 2/1946 | Miller | 260—92.3 |
| 2,606,893 | 8/1952 | Reynolds et al. | 260—92.3 |
| 3,047,544 | 6/1962 | Byrd | 260—94.4 |

MURRAY TILLMAN, *Primary Examiner.*

J. ZIEGLER, *Assistant Examiner.*